(12) United States Patent
Hansson et al.

(10) Patent No.: US 11,426,261 B2
(45) Date of Patent: Aug. 30, 2022

(54) FIXTURE

(71) Applicant: DENTSPLY SIRONA Inc., York, PA (US)

(72) Inventors: Stig Hansson, Askim (SE); Anders Halldin, Mölndal (SE)

(73) Assignee: DENTSPLY SIRONA INC., York, PA (US)

( * ) Notice: Subject to any disclaimer, the term of this patent is extended or adjusted under 35 U.S.C. 154(b) by 72 days.

(21) Appl. No.: 16/021,512

(22) Filed: Jun. 28, 2018

(65) Prior Publication Data

US 2018/0303585 A1 Oct. 25, 2018

Related U.S. Application Data

(63) Continuation of application No. 13/444,975, filed on Apr. 12, 2012, now abandoned.
(Continued)

(30) Foreign Application Priority Data

Apr. 14, 2011 (EP) ..................................... 11162464

(51) Int. Cl.
    *A61C 8/00* (2006.01)
(52) U.S. Cl.
    CPC .......... *A61C 8/0018* (2013.01); *A61C 8/0025* (2013.01)
(58) Field of Classification Search
    CPC ....... A61C 8/0018; A61C 8/0025; A61C 8/00; A61C 8/0022
(Continued)

(56) References Cited

U.S. PATENT DOCUMENTS

| 5,823,777 | A | 10/1998 | Misch |
| 6,896,517 | B1 | 5/2005 | Bjoern |
| 7,677,891 | B2 * | 3/2010 | Niznick ............... A61C 8/0022 433/174 |

(Continued)

FOREIGN PATENT DOCUMENTS

| CN | 201775688 U | 3/2011 |
| EP | 0997112 A1 | 5/2000 |

(Continued)

OTHER PUBLICATIONS

Written Opinion of the International Searching Authority; PCT/EP2012/056723; Aug. 17, 2012 (completed); dated Aug. 24, 2012.
(Continued)

*Primary Examiner* — Nicholas D Lucchesi
*Assistant Examiner* — Mirayda A Aponte
(74) *Attorney, Agent, or Firm* — Dentsply Sirona Inc.

(57) ABSTRACT

The present invention relates to a fixture for insertion into a bore hole arranged in bone tissue, comprising a threaded leading portion and a threaded trailing portion located coronally of the leading portion, wherein the threading of the leading portion has at least one first thread spiral, wherein the threading of the trailing portion has at least one more thread spiral than the threading in the leading portion, wherein the threading of the trailing portion and the threading of the leading portion have the same or substantially the same lead, wherein the profile of at least one of the thread spirals in the trailing portion is, at least along a portion of its length, substantially the same as the profile of the outermost parts of said first thread spiral in the leading portion, and wherein the at least one thread spiral in the trailing portion having substantially the same profile as the outermost part of said first thread spiral in the leading portion is arranged to follow the spiral path of that thread spiral.

9 Claims, 9 Drawing Sheets

Related U.S. Application Data

(60) Provisional application No. 61/475,329, filed on Apr. 14, 2011.

(58) Field of Classification Search
USPC .......................................................... 433/174
See application file for complete search history.

(56) References Cited

U.S. PATENT DOCUMENTS

| | | | |
|---|---|---|---|
| 2009/0136898 A1 | 5/2009 | Kim | |
| 2011/0045437 A1* | 2/2011 | Arni | A61C 8/0022 433/174 |
| 2011/0070558 A1* | 3/2011 | Park | A61C 8/0025 433/174 |

FOREIGN PATENT DOCUMENTS

| | | | |
|---|---|---|---|
| EP | 2233108 A1 | 9/2010 | |
| EP | 2292176 A1 | 3/2011 | |
| WO | 9729713 A1 | 8/1997 | |
| WO | 2000003657 A1 | 1/2000 | |
| WO | 2003015654 A1 | 2/2003 | |
| WO | 2005079697 A1 | 9/2005 | |
| WO | 2009054005 A2 | 4/2009 | |
| WO | 20090054650 A1 | 4/2009 | |
| WO | WO-2009054650 A1 * | 4/2009 | ........... A61C 8/0025 |
| WO | 2009072764 A1 | 6/2009 | |

OTHER PUBLICATIONS

International Search Report; PCT/EP2012/056723; Aug. 17, 2012 (completed); dated Aug. 24, 2012.
International Preliminary Report on Patentability (IPRP) Chapter I; Aug. 17, 2012 (completed); dated Aug. 24, 2012.
International Search Report; PCT/EP2012/056725; Aug. 14, 2012 (completed); dated Aug. 27, 2012.
European Search Report; Application No. 11162464.9; Sep. 16, 2011 (completed).

* cited by examiner

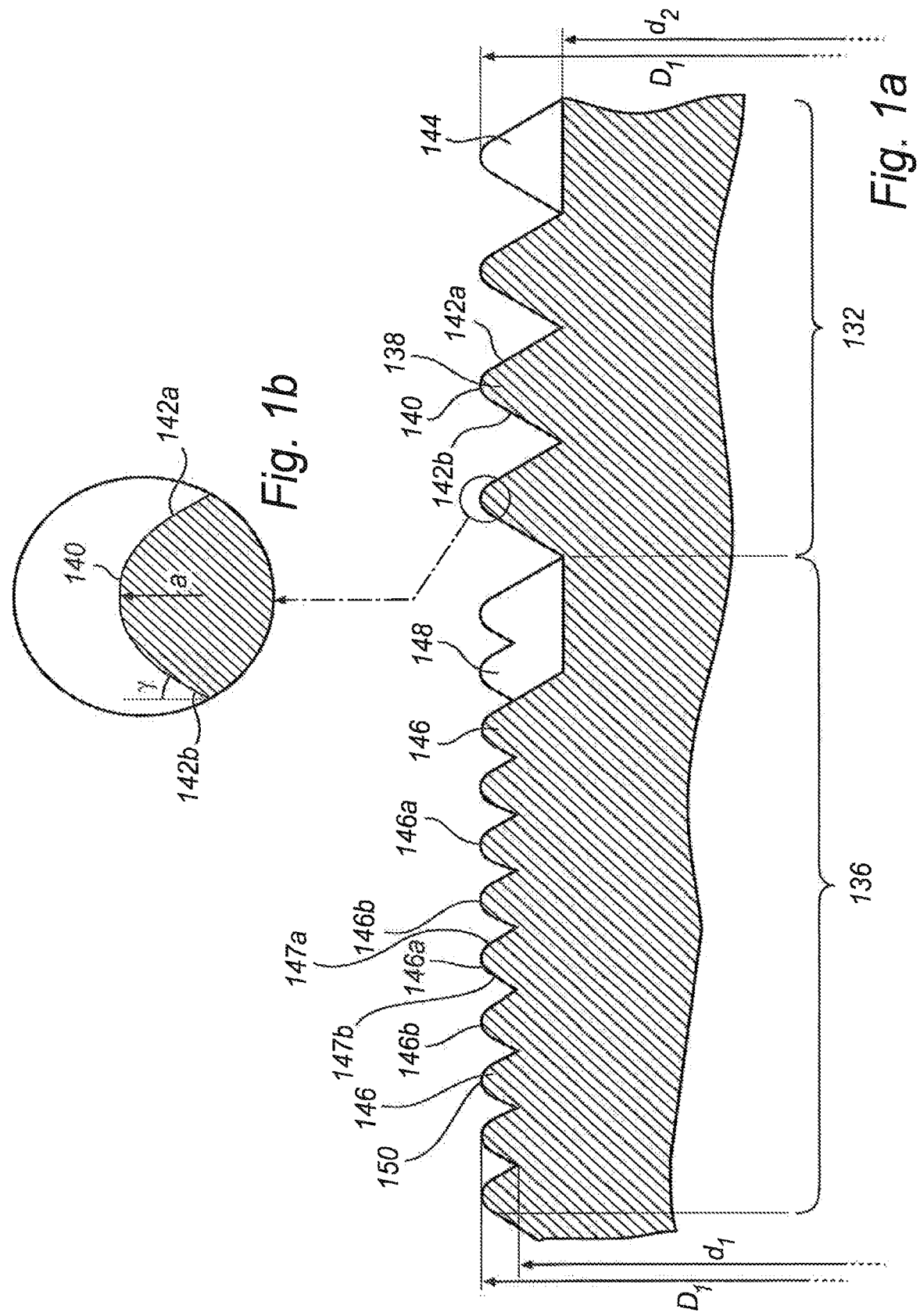

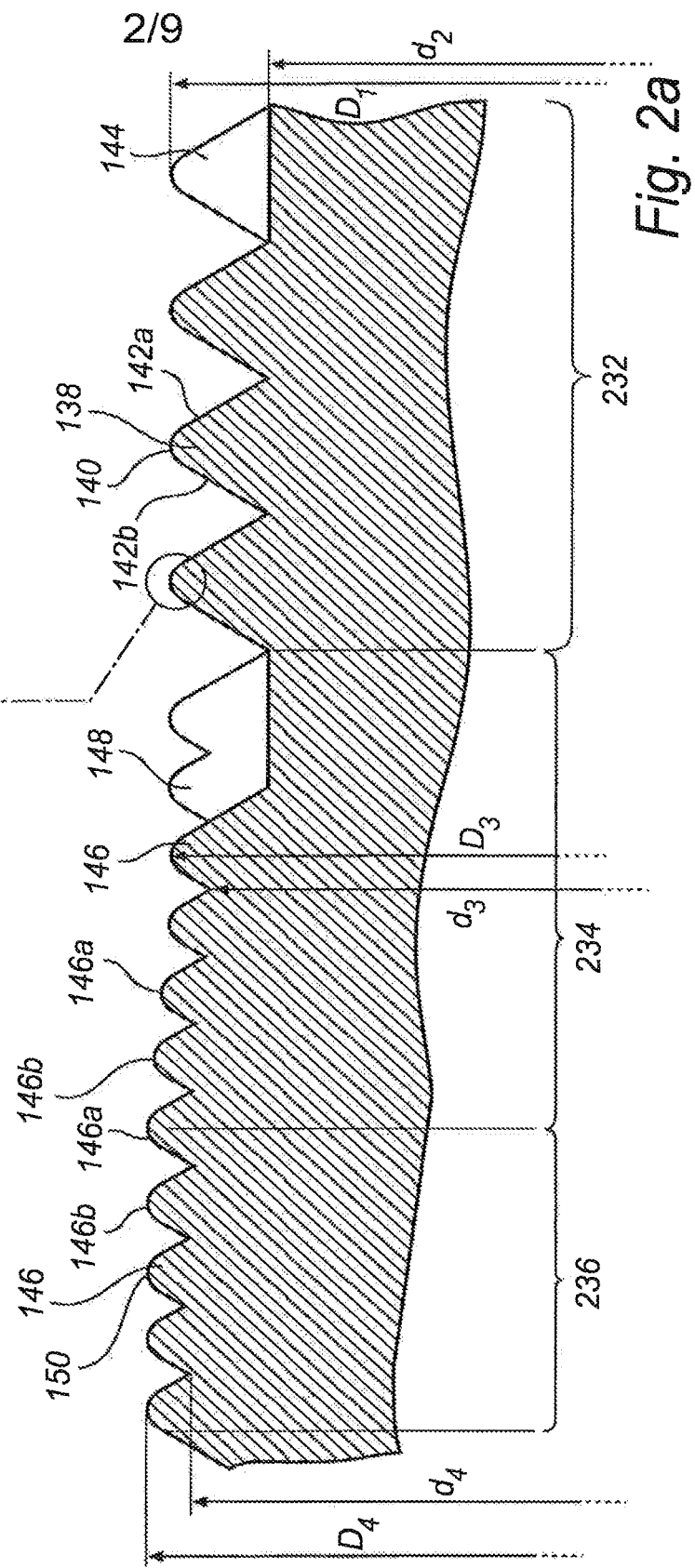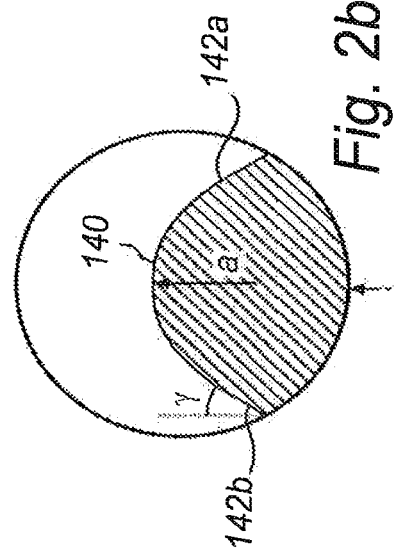

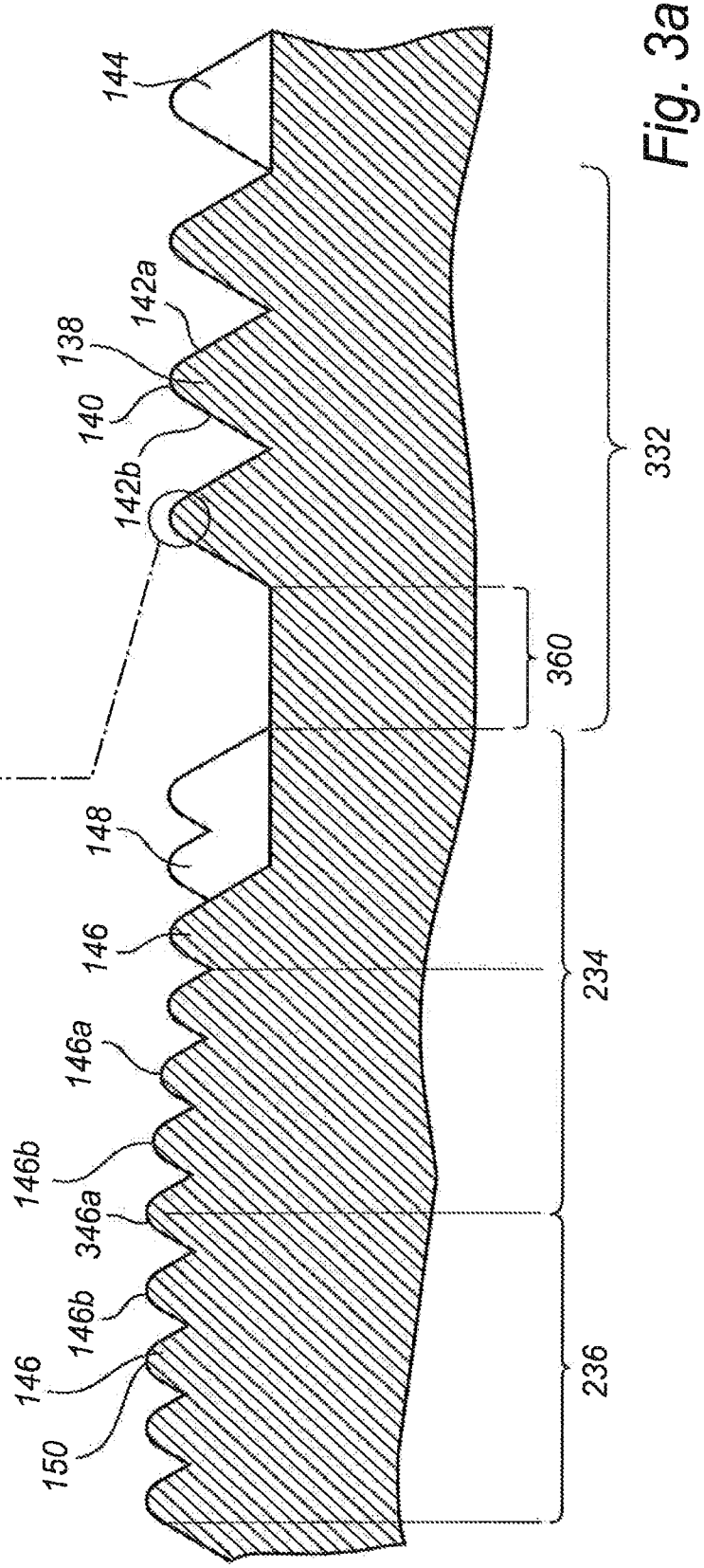
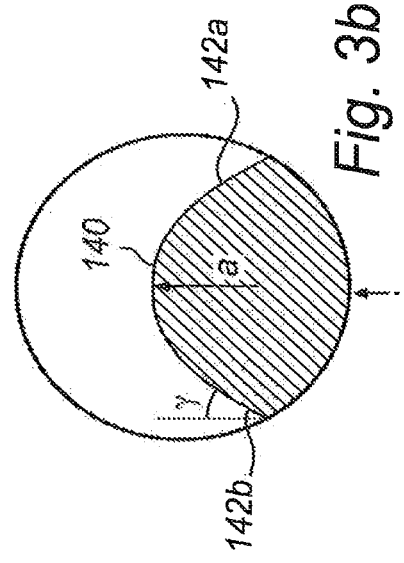

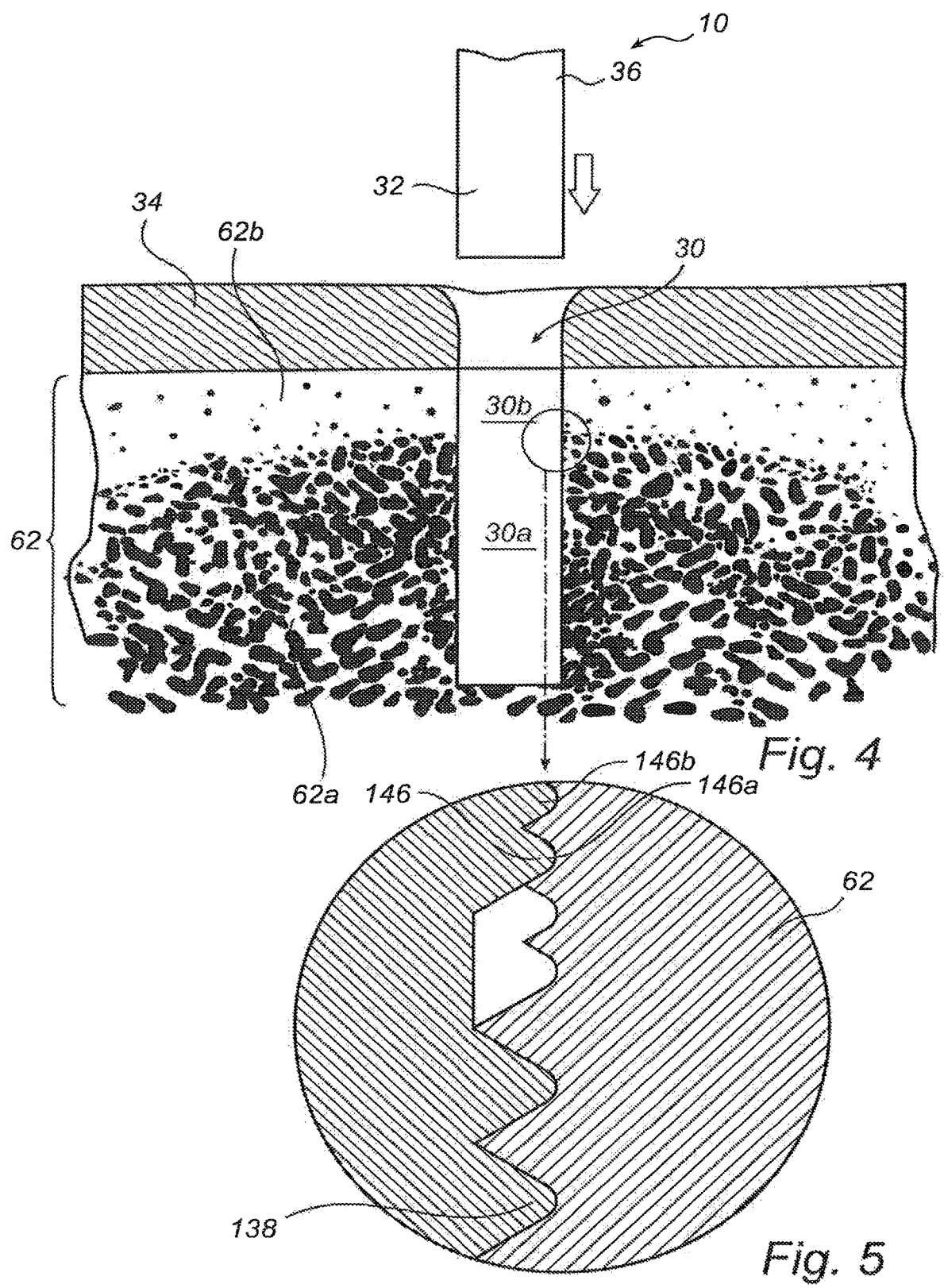

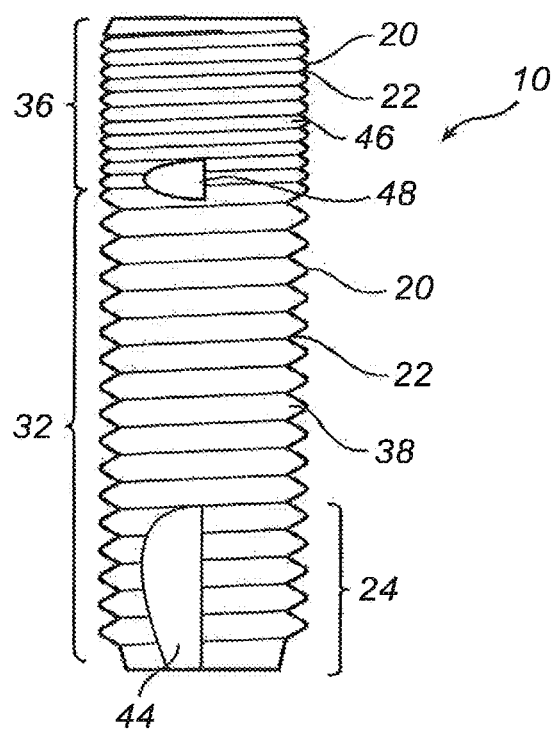
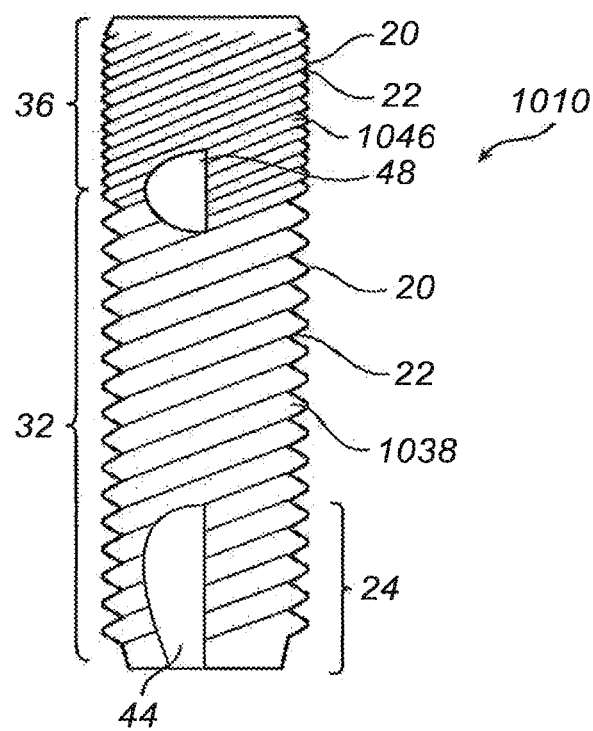
Fig. 9
Fig. 10

FIXTURE

TECHNICAL FIELD

The present invention relates to a fixture for insertion into a bore hole arranged in bone tissue, the fixture comprising a threaded outer surface for engagement with the bone tissue.

BACKGROUND OF THE INVENTION

A frequent way today to restore a damaged limb, such as lost tooth, is to install a fixture in the adjacent bone tissue and replace the damaged parts. In this respect, for a successful result, the fixture should become fully stable and correctly joined to the bone. The term osseointegration is used for this joining effect, the basic meaning of this term being the bone tissue growth into the fixture surface. The two major contributors to this joint are a mechanical joint and an organic joint. The former being generally influenced by the macro geometry of the bore into which the fixture is installed, and by the macro geometry of the fixture, and is a direct effect of how well these two work together. The latter one being a continuously evolving and developing effect, particularly during the time immediately after installation, and being generally influenced by how well the micro surface structure of the fixture interacts with the bone tissue.

Due to ingrowth there will be an interlocking effect between the bone and the fixture. Also, the mechanical joint is developed over time since the bone tissue, under ideal conditions, may grow into surface cavities of the fixture, and grow into voids left between the fixture and the bore after installation.

It is furthermore relevant to obtain both a good initial (primary) fixation and a good long-term fixation of the fixture in bone.

There is a continuous endeavour in the industry to further increase the stability of fixtures implanted in bone tissue and to improve the basic conditions during the healing phase after fixture installation. One example is the provision of the fixture surface with different types of structures, such as micro-roughened or blasted structures for increasing the contact surface between the fixture and the bone.

Nevertheless, there is still room for further development of fixtures as regards their stability in bone tissue.

SUMMARY OF THE INVENTION

An object of the present invention is to provide a dental fixture which has a high stability during the healing phases of the fixture. This and other objects, which will become apparent in the following, are accomplished by means of a dental fixture as defined in the accompanying claims.

According to a first aspect of the present invention, a dental fixture for insertion into a bore hole arranged in bone tissue is provided. The dental fixture comprising a threaded leading portion and a threaded trailing portion located coronally of the leading portion, wherein the threading of the leading portion has at least one first thread spiral, wherein the threading of the trailing portion has at least one more thread spirals than the threading in the leading portion, wherein the threading of the trailing portion and the threading of the leading portion have the same or substantially the same lead, wherein the profile of at least one of the thread spirals in the trailing portion is, at least along a portion of its extension, substantially the same as the profile of the outermost part of said first thread spiral in the leading portion, and wherein the at least one thread spiral in the trailing portion having substantially the same profile as the outermost part of said first thread spiral in the leading portion is arranged to follow the spiral path of said first thread spiral.

A dental fixture being provided in the manner described above will provide both a good primary fixation and a good long-term fixation of the fixture in the bone.

By profile of the thread is meant to understand the contour or outline of the thread. Hence, for two threads to have substantially the same profile, the characteristics defining the outer contour of the thread should be similar to each other.

With outermost parts of a thread spiral is meant to understand a part of the thread spiral from the top of the thread towards the thread bottom. The amount of the thread belonging to the outermost part may vary. It may in fact, in those cases where the minor diameter of the macrothreaded section and the microthreaded section is the same, be the entire thread. However, when the minor diameter of the microthreaded section is larger than the minor diameter of the macrothreaded section, the entire macrothread will not be considered to be the outermost part. Instead, the portion of the macrothread belonging to the outermost part is the portion being situated further away from the central axis of the implant, as compared to the distance between the central axis of the implant and the minor diameter of the microthreaded portion. Furthermore, there exist embodiments where there is a curved transition between the threads, i.e. the thread has a bottom radius. In those embodiments, the outermost part of the macrothread is considered to be the part of the macrothread being situated further away from the central axis of the implant than the bottom radius portion of the microthread.

When the fixture is inserted into a bore, said first thread of the leading portion will either create a path in the case of a self-tapping fixture or follow a path in the case of a pre-tapped hole through the cortical bone and into the cancellous bone. Since one of the thread spirals in the trailing portion is synchronized with said first thread spiral in the leading portion, the thread spiral in the trailing portion will follow the same spiral path through the bone.

By providing at least one of the thread spirals in the trailing portion, i.e. the thread spiral following the path of said first thread spiral in the leading portion, with a similar or substantially the same geometrical profile as said first thread spiral in the leading portion, at least along a portion of its length, the female threading in the bone will be filled with threads throughout the length of the fixture, or at least for the portions where the profiles are substantially the same. Hence, the fixture will be supported by thread spirals being in contact with the bone throughout at least a large portion of the length of the implant.

The thread spirals in the trailing section are primarily engaged with the hard cortical bone once the fixture has been inserted. By providing more thread spirals at the trailing section, the area of the threads being engaged with the bone increases, as compared to a section having fewer thread spirals. This may be beneficial in terms of improving the initial stability of the implant in the bone.

It may for certain embodiments be an advantage with not providing the entire thread spiral with a thread having substantially the same profile as the first thread spiral. The potential advantage is that it provides for the possibility to e.g. create blood chambers or condensation of the bone at selected positions along the implant. According to one exemplary embodiment, the thread profile is provided so that blood chambers become positioned substantially on the coronal side of the threading. By this, the threads will be in contact with bone on their apical side, hence providing support for the implant when it is impacted by forces from e.g. chewing.

According to one exemplary embodiment, the thread spiral following the path of said first thread spiral in the leading portion has substantially the same profile as said first thread spiral in the leading portion along its entire length. By this, the path of the female threading in the bone in which the thread at the leading portion travels will be filled with threading throughout the length of the fixture. Hence, the fixture will be supported by thread spirals being in contact with the bone throughout the length of the implant. This provides for a good initial stability and a good ability to carry loads and distribute these loads to the bone in a beneficial manner.

The thread spiral following the path of said first thread spiral in the leading portion may, but need not be, continuous with the first thread spiral in the leading portion. Furthermore, the leading and trailing portions of the implant may, but need not be, positioned adjacent each other. It is for example conceivable with another threaded portion between the leading and trailing portion. It is also conceivable with a non-threaded surface between the leading and trailing portion. The non-threaded surface may e.g. be smooth or roughened.

According to at least one exemplary embodiment, the thread spiral in the trailing portion that follows the path of said first thread spiral in the leading portion has the same radius of curvature at the top of the peaks as said first thread spiral. The radius of curvature at the top of the peaks is a geometrical characteristic that influences the profile of the thread.

According to at least one exemplary embodiment, the thread does not have a curvature at the top of the peak. Instead, the top may have a straight extension.

According to at least one exemplary embodiment, the thread spiral in the trailing portion that follows the path of said first thread spiral in the leading portion has the same flank angles, respectively, as said first thread spiral. The flank angles are a geometrical characteristic that influences the profile of the thread.

The flank angle at the apical side of the thread may be similar to the flank angle at the coronal side of the thread. It is however also conceivable with different flank angles at the apical and coronal sides of the thread. The thread spiral in the trailing portion that follows the path of said first thread spiral in the leading portion has the same flank angles, respectively, as said first thread spiral. Hence, in this embodiment the coronal flank angle of the two threads is the same, and the apical flank angles of the two threads are the same, even if there may be different angles at the coronal and apical flanks, respectively.

According to at least one exemplary embodiment, the flanks of the threads have a straight extension.

According to at least one exemplary embodiment, the flanks of the threads have a curved extension. It is for example conceivable with flanks having a concave curvature. It is also conceivable with flanks having a convex curvature.

The different characteristics defining the profile of the thread that have been mentioned above for different exemplary embodiments may of course be combined in any suitable manners.

According to at least one exemplary embodiment, all thread spirals in the trailing portion have substantially the same profile as the outermost part of said first thread spiral in the leading portion. In this embodiment, all threads in the trailing portion are similar to and has the same thread profile as the at least one thread in the leading portion.

According to another exemplary embodiment, the profile of the thread spirals in the trailing portion are different from each other, or from one of the other thread spirals in case of more than two thread spirals. Characteristics of the thread spiral defining its profile is e.g. thread height, curvature radius at the top of the thread (if any), flank angle, flank extension, flank curvature, thread width, transition between adjacent threads and major diameter of the implant. By this, it is possible to e.g. provide one thread spiral that creates a blood chamber between itself and the bone, or a thread spiral that creates condensation of the bone as it is being inserted.

According to at least one exemplary embodiment, the profile of one of the thread spirals in the trailing portion, that does not follow the path of said first thread spiral in the leading portion, alters along the thread.

A thread spiral of the trailing portion that does not follow the path of a thread spiral in the leading portion will cut into the bone between the female thread path of the thread spiral or spirals of the leading portion. The thread spirals may be either self-tapping or enter into a pre-tapped bore. It may for certain embodiments be beneficial if the profile alters along the tread spiral or spirals. Characteristics of the thread spiral defining its profile is e.g. thread height, curvature radius at the top of the thread (if any), flank angle, flank extension, flank curvature, thread width and major diameter of the implant. By alternating one or more of the characteristics along the length of the thread spiral it is possible to create e.g. blood chambers between the thread and the bone at certain positions, and to create a tight fit between the thread and the bone at other positions. It is also e.g. possible to create a tight fit between the thread and the bone at certain positions and to create a condensation of the bone at other positions, or to create a fixture which alters between providing blood chambers and condensation of the bone along its length.

According to one exemplary embodiment, more than one thread spiral in the trailing portion has a different or a varying profile along the length of the respective thread spiral. It is not necessary that the characteristics of the thread spirals that vary, varies in the same manner. Hence, one of the thread spirals may e.g. be designed to create blood chambers and one of the thread spirals may e.g. be designed to create condensation of the bone.

According to at least one exemplary embodiment, the smallest spacing between adjacent peaks of the threading in the trailing portion is smaller than the smallest spacing between adjacent peaks of the threading in the leading portion.

When measuring the axial spacing between adjacent peaks, the smallest spacing between adjacent peaks in the trailing portion is smaller than the smallest spacing between adjacent peaks in the leading portion. When measuring the axial spacing between adjacent peaks, the measurement is to be taken between the tops of the peaks and not in the valleys.

If the thread in the leading portion has one thread spiral and the thread in the trailing portion has two thread spirals that are evenly distributed, the axial spacing between adjacent peaks in the trailing portion will be substantially half the distance between adjacent peaks in the leading portion. If the thread in the leading portion has one thread spiral and the thread in the trailing portion has three thread spirals that are evenly distributed, the axial spacing between adjacent peaks in the trailing portion will be approximately a third of the distance between adjacent peaks in the leading portion.

However, there also exist fixtures in which the thread spirals are not evenly distributed. There also exist fixtures being provided with a major thread being provided with minor threads at its top. In these cases, the distance between the major threads should be measured separately, and the distance between minor threads should be measured separately. Hence, one should not mix between the two different thread types in one portion of the fixture when measuring the smallest axial distance.

According to at least one exemplary embodiment, the number of thread spirals in the threaded trailing portion is a multiple integer of the number of thread spirals in the leading portion.

In order to be able to provide a thread spiral in the trailing portion following the path of a thread spiral in the leading portion, it is beneficial if the number of thread spirals in the trailing portion is a multiple integer of the number of thread spirals in the leading portion. Hence, if there is provided one thread spiral in the leading portion, the number of thread spirals in the trailing portion may be two, three, four and so on. If there is provided two thread spirals in the leading portion, the number of thread spirals in the trailing portion may be four, six, and so on. If there is provided three thread spirals in the leading portion, the number of thread spirals in the trailing portion may be six, nine, and so on.

According to one exemplary embodiment, the number of thread spirals in the threaded trailing portion is not a multiple integer of the number of thread spirals in the leading portion. It is possible to provide an implant in which the number of thread spirals in the trailing portion is not a multiple integer of the number of thread spirals in the leading portion, and in which one of the thread spirals in the trailing portion follows the path of one of the thread spirals in the leading portion. This is for example conceivable if the thread spirals are not evenly distributed, i.e. the axial distance between adjacent thread spirals differ from one another, along the length of the implant.

According to at least one exemplary embodiment, the threading in the leading portion has at least a first and a second thread spiral, and wherein one of the thread spirals in the trailing portion follows the path of said first thread spiral in the leading portion.

In those embodiments where the leading portion is provided with two thread spirals, i.e. a double thread, a first thread spiral in the trailing portion may follow the path of the first thread spiral in the leading portion.

According to one exemplary embodiment, a second thread spiral in the trailing portion may follow the path of the second thread spiral in the leading portion. These two thread spirals in the trailing and leading portion, respectively, may also have the same profile so that the female threading in the bone is being filled, thereby providing support for the fixture along the length of the implant.

According to at least one exemplary embodiment, a second thread spiral in the trailing portion does not follow the path of the second thread spiral in the leading portion.

According to at least one exemplary embodiment, the fixture is self-tapping. There exist different manners in how to provide an implant with self-tapping capabilities, it is for example possible to provide the implant with cutting means extending from the apical end into the threaded leading portion. However, it is also possible for an implant to be self-tapping even if it does not comprise any cutting means.

According to at least one exemplary embodiment, the fixture is provided with separate cutting means adapted for cutting a female thread in the bone that corresponds to the profile of at least one of the thread spirals at the trailing portion.

Providing separate cutting means at the trailing portion provides for the opportunity to cut out a female thread for the threading of the trailing portion. By this, the trailing portion may be inserted into the bone with the amount of bone being crushed during insertion being reduced.

The cutting means at the trailing portion may preferably begin at the apical end of the trailing portion, and extend coronally into the trailing portion.

According to at least one exemplary embodiment, the cutting means provided for cutting a female thread in the bone corresponding to the profile of the thread spirals at the trailing portion extends over at least one turn of all thread spirals at the trailing portion. With extending over at least one turn of all thread spirals, it is meant to understand that it extends over an axial length corresponding to the axial extension of one full rotation of the thread spirals. Hence, if the thread at the trailing portion is a double-thread, the cutting means extend over at least both threads, if the thread is a triple-thread, the cutting means extend over at least all three threads, and so on. The cutting means, may, but does not need to, extend over several rotations of each one of the thread spirals. By this, a female thread corresponding to the thread of the trailing portion will be cut in the bone and the bone will thereby not have to be subject to the strong impact that could otherwise be a risk when a thread is pressed into bone that has not been properly prepared.

According to at least one exemplary embodiment, the cutting means provided for cutting a female thread in the bone corresponding to the profile of the thread spirals at the trailing portion is provided to cut a female thread corresponding to both the outer and inner diameter of the thread at the trailing portion. By this, a female thread corresponding to the thread of the trailing portion will be cut in the bone and the bone will thereby not have to be subject to the strong impact that could otherwise be a risk when a thread is pressed into bone that has not been properly prepared.

Furthermore, depending on the configuration of the cutting means in relation to the profile of the thread in the trailing portion, e.g. the shape and minor and major diameter of the cutting means, it is possible to design fixtures in which a desired rate of condensation of the bone occurs. Obviously, a desired rate of condensation may be zero condensation.

According to at least one exemplary embodiment, the depth of the threads in the leading portion is larger than the depth of the threads in the trailing portion. A configuration according to this embodiment has proven to be beneficial in terms of load distribution to the bone, thereby providing for good initial and long-term stability of the fixture.

According to at least one exemplary embodiment, the major diameter of the fixture is similar in both the leading portion and the trailing portion.

According to at least one exemplary embodiment, the major diameter of the fixture is greater in the trailing portion than in the leading portion. By providing the trailing portion with a larger major diameter than the leading portion, a condensation of the bone surrounding the trailing portion will occur when the implant is inserted into the bone, in the case of a straight cylindrical bore hole.

According to at least one exemplary embodiment, the major diameter of the fixture is increasing in the trailing portion, as seen in apical to coronal direction. By providing the trailing portion with an increasing major diameter a gradually increasing condensation of the bone surrounding the trailing portion will occur when the implant is inserted into the bone, in the case of a straight cylindrical bore hole.

According to at least one exemplary embodiment, the fixture is further provided with a transition portion, provided between the leading portion and the trailing portion, wherein the major diameter of the fixture is increasing in the transition portion.

According to at least one exemplary embodiment, the fixture is further provided with a transition portion, provided between the leading portion and the trailing portion, wherein the minor diameter of the fixture is increasing in the transition portion.

According to at least one exemplary embodiment, the major and/or minor diameter of the fixture is continuously increasing in the transition portion.

According to at least one exemplary embodiment, at least a portion of the transition portion is provided with a threading, wherein the threading of the transition portion continues into the trailing portion.

According to at least one exemplary embodiment, the thread of the transition portion is similar to the thread of the trailing portion.

According to one exemplary embodiment, the cutting means provided for cutting a female thread in the bone corresponding to the profile of the thread spirals at the trailing portion, is provided at the transition portion.

The cutting means at the transition portion may preferably begin at the apical end of the transition portion, and extend coronally into the transition portion.

According to at least one exemplary embodiment, the cutting means provided for cutting a female thread in the bone corresponding to the profile of the thread spirals at the trailing portion extends over at least one turn of all thread spirals at the transition portion. With extending over at least one turn of all thread spirals, it is meant to understand that it extends over an axial length corresponding to the axial extension of one full rotation of the thread spirals. Hence, if the thread at the transition portion and trailing portion is a double-thread, the cutting means extend over at least both threads, if the thread is a triple-thread, the cutting means extend over at least all three threads, and so on. The cutting means, may, but does not need to, extend over several rotations of each one of the thread spirals.

According to one exemplary embodiment, the major diameter of the cutting means at the transition portion or the cutting means at the trailing portion is similar to the major diameter of the threads at the leading portion. Hence, in this embodiment, there is no increase of the major diameter of the fixture between the coronal end of the leading portion and the cutting means at the apical end of the transition portion and/or the cutting means at the apical end of the trailing portion.

According to one exemplary embodiment, the major diameter of the fixture is constant throughout the length of the cutting means at the transition portion or trailing portion. According to one exemplary embodiment, the minor diameter of the fixture is constant throughout the length of the cutting means at the transition portion or trailing portion. Hence, according to these exemplary embodiments, there is no major and/or minor diameter increase at the cutting means provided for cutting a female thread in the bone corresponding to the thread of the trailing portion of the fixture.

According to one exemplary embodiment, the major diameter increases at the transition portion, coronally of the cutting means.

According to one exemplary embodiment, the minor diameter increases at the transition portion, coronally of the cutting means.

Hence, according to either one or a combination of these exemplary embodiments, a female thread corresponding to the thread of the transition portion and/or trailing portion may be cut into the bone by the cutting means. Thereafter, when the major and/or minor diameter increases coronally of the cutting means, a controlled condensation of the bone will be achieved.

According to one exemplary embodiment, the cutting means may preferably begin at the apical end of the transition portion, and extend coronally into the transition portion.

According to at least one exemplary embodiment, the length of the transition portion is such that the transition portion extends over at least one turn of the thread, preferably at least two turns of the thread, and most preferred over at least three turns of the thread. By one turn of the thread is meant to understand one full rotation of each one of the thread spirals, in case of a multi-start thread. By this, the diameter increase will be gradual and not sudden. This is beneficial since a sudden diameter increase may affect the surrounding bone negatively during insertion of the fixture into the bone.

A dental implant may comprise a dental fixture and a superstructure, such as an abutment.

A dental fixture is for use as the anchoring member of a dental prosthesis. To this end, the dental fixture is insertable into a pre-prepared bore hole in the bone tissue of a jawbone (maxilla or mandible) at a site where the dental prosthesis is required. The dental fixture is normally rotated into the bore hole.

For screw-type dental fixtures the bore hole may be provided with internal threads in advance or may be left un-tapped with the dental fixture provided with a self-tapping capacity, e.g. by the provision of one or more axially-extending cutting recesses, edges or notches, etc in the fixture thread. For instance, an apical end portion of the fixture may be provided with 2-4 cutting recesses, such as 3 cutting recesses. Other number of cutting recesses are readily conceivable.

A superstructure for connecting a prosthetic part to the fixture may comprise an abutment, spacer or other transmucosal component which engages to the dental fixture to bridge the gingiva overlying the maxilla or mandible. The prosthetic part, e.g. a crown, bridge or denture may be secured to the abutment. There are various other forms that the superstructure can take. For instance, the prosthetic part may be secured directly to the dental fixture. A dental implant may thus comprise an abutment connected to the dental fixture, or the dental fixture without an abutment.

The term "coronal" is here and throughout this application used to indicate a direction towards a head end or trailing end of the dental implant. For instance, in a situation where an abutment is connected to a dental fixture, the coronal direction of the abutment would be a direction towards the part of the abutment being directed away from the fixture. Conversely, the term "apical" indicates a direction towards an insertion or leading end of the component. Thus, apical and coronal are opposite directions. Furthermore, the terms "axial", "axial direction" or "axially" are used throughout this application to indicate a direction taken from the coronal end to the apical end, or vice versa. The terms "radial", "radial direction" or "radially" indicate a direction perpendicular to the axial direction.

A blind bore or socket may extend apically into the fixture body from the coronal end to an end surface in-between the apical and coronal ends of the fixture body for a superstructure to be secured to the fixture. The socket may comprise an internally-threaded section for screw connection of the superstructure to the fixture. A rotational lock for the superstructure may be provided in the socket, such as an internal polygonal side wall, e.g. hexagonal, or alternatively one or more protrusions from or indentation in the wall of the socket. A section of the socket, such as the coronal section, may be tapered towards the apical end. The tapered section is suitably arranged coronally of the internally-threaded section.

The fixture may be used in a one stage procedure or a two stage procedure. In a one stage procedure a healing or temporary abutment is connected to the fixture to form the gingival tissue, and after a healing period the healing or temporary abutment is replaced by a permanent abutment. For a two stage procedure the fixture is provided with a cover screw and the gingival tissue is sutured over the fixture and cover screw, and after a healing period the tissue is opened up and an abutment is connected to the fixture after removal of the cover screw.

A conceivable alternative to having an abutment connected to the fixture is to have a one-piece implant, wherein a portion of the implant is embedded in bone tissue, while another portion of the implant extends from the bone tissue across the gingiva.

The fixture may have a conically tapering end portion which tapers towards the coronal end. The axial extent of this coronal end portion is small compared to the total length of the fixture, as an example no more than 4% of the total length, such as in the range of 1.5%-3.7%. The coronal end portion may suitably be provided without a threaded surface, e.g. having a smooth or a roughened (such as blasted) surface.

The fixture may have a substantially flat coronal end surface which is perpendicular to the longitudinal axis of the fixture. Alternatively, the coronal end surface may have a sloped contour relative to the longitudinal axis of the fixture, e.g. such that when positioned within the jawbone the length of the fixture is larger on a lingual side and shorter on a buccal side of the fixture. Another alternative is a saddle-shaped or wave-like coronal end surface.

The length of the dental fixture may be in the range of 5-19 mm, depending on the clinical situation. The outer diameter of the dental fixture may suitably be in the range of 2-6 mm, such as 3-5 mm.

The fixture may be substantially cylindrical or slightly tapering from the coronal end towards the apical end. If the fixture has a slight tapering, the core of the fixture and the outer periphery defined by e.g. thread tops may have the same or different angle of taper. Furthermore, the core of the fixture may be cylindrical while the thread tops describe a concinnity or, conversely, the core of the fixture may be tapered while the thread tops describe a generally cylindrical geometry. Alternatively, the fixture may comprise a combination of one or more cylindrical and/or one or more tapering portions. Thus, one or more portions of the fixture may have e.g. thread tops lying in a common imaginary cylindrical surface, which cylindrical surface is parallel with the longitudinal axis of the fixture. Alternatively or additionally, one or more portions of the fixture may have thread tops lying in an imaginary conical surface which in the apical direction is tapering towards the longitudinal axis.

The externally threaded fixture may comprise one or more thread spirals.

The term "pitch" is used to indicate the axial distance between adjacent tops of a threading. The term "lead" is used to indicate the distance advanced parallel to the longitudinal axis when the fixture is turned one revolution, i.e. it corresponds to the pitch multiplied with the number of thread spirals. For a single thread spiral having a constant pitch, the lead is equal to the pitch; for a double thread spiral, the lead is twice the pitch.

The term "microthread" is used to indicate a thread having a height which is no greater than 0.2 mm. According to at least one example embodiment, the fixture is provided with microthreads having a height in the range of 0.02-0.2 mm, such as 0.05-0.015 mm, for instance 0.1 mm. The term "macrothread" is used to indicate a thread having a height which is greater than 0.2 mm. According to at least one example embodiment, the fixture is provided with macrothreads having a height in the range of 0.25-0.35 mm, such as 0.3 mm.

Suitably, microthreads may be located coronally of macrothreads. For instance, microthreads may be arranged to engage dense cortical bone and macrothreads may be arranged to engage porous spongious/cancellous bone. The lead of a microthread suitably corresponds to the lead of a macrothread. The macrothread pitch may, as an example, be 2-4 times, such as 3 times, the pitch of the microthreads. The pitch (top-to-top spacing) at a fixture portion provided with microthreads may be around 0.10-0.30 mm, for instance 0.20-0.24 mm. The pitch (top-to-top spacing) at a fixture portion provided with macrothreads may be around 0.30-0.90 mm, for instance 0.60-0.72 mm.

Microthreads can be regarded as defined, oriented roughness. A non-oriented roughness having smaller dimensions, for instance obtained by blasting, etching, etc., may be superimposed on microthreads as well as on macrothreads.

A thread profile may comprise two flanks, a top interconnecting said two flanks, a bottom formed between two adjacent threads, said flanks forming an acute angle v with a plane which is perpendicular to the fixture axis and which angle v lies in a plane containing the extension of the fixture axis, said profile further having a height D. The top may be curved and may have a top radius. Suitably, for $10° \leq v < 35°$, the top radius is greater than $0.4 \times D$ and, for $35° \leq v < 55°$, the top radius is greater than $0.2 \times D$.

In this application, when strain is discussed, or when different values of strain are discussed, unless explicitly specified, the discussion may relate to tensile strain and/or compressive strain. All strain-related numbers are presented in absolute values.

BRIEF DESCRIPTION OF THE DRAWINGS

FIGS. 1a-1b illustrate a portion of the threading of the leading and trailing portions, respectively, of a fixture, according to at least one example embodiment of the present invention.

FIGS. 2a-2b illustrate a portion of the threading of the leading and trailing portions, respectively, of a fixture, according to at least one other example embodiment of the present invention.

FIGS. 3a-3b illustrate a portion of the threading of the leading and trailing portions, respectively, of a fixture, according to at least one other example embodiment of the present invention.

FIG. 4 illustrates an example of an installation of a fixture according to at least one example embodiment of the present invention.

FIG. 5 illustrates an example of a fixture installed in bone according to at least one example embodiment of the present invention.

FIG. 9 illustrate a fixture according to at least one example embodiment of the present invention.

FIG. 10 illustrate a fixture according to at least one other example embodiment of the present invention.

DETAILED DESCRIPTION OF THE DRAWINGS

Figure 6:
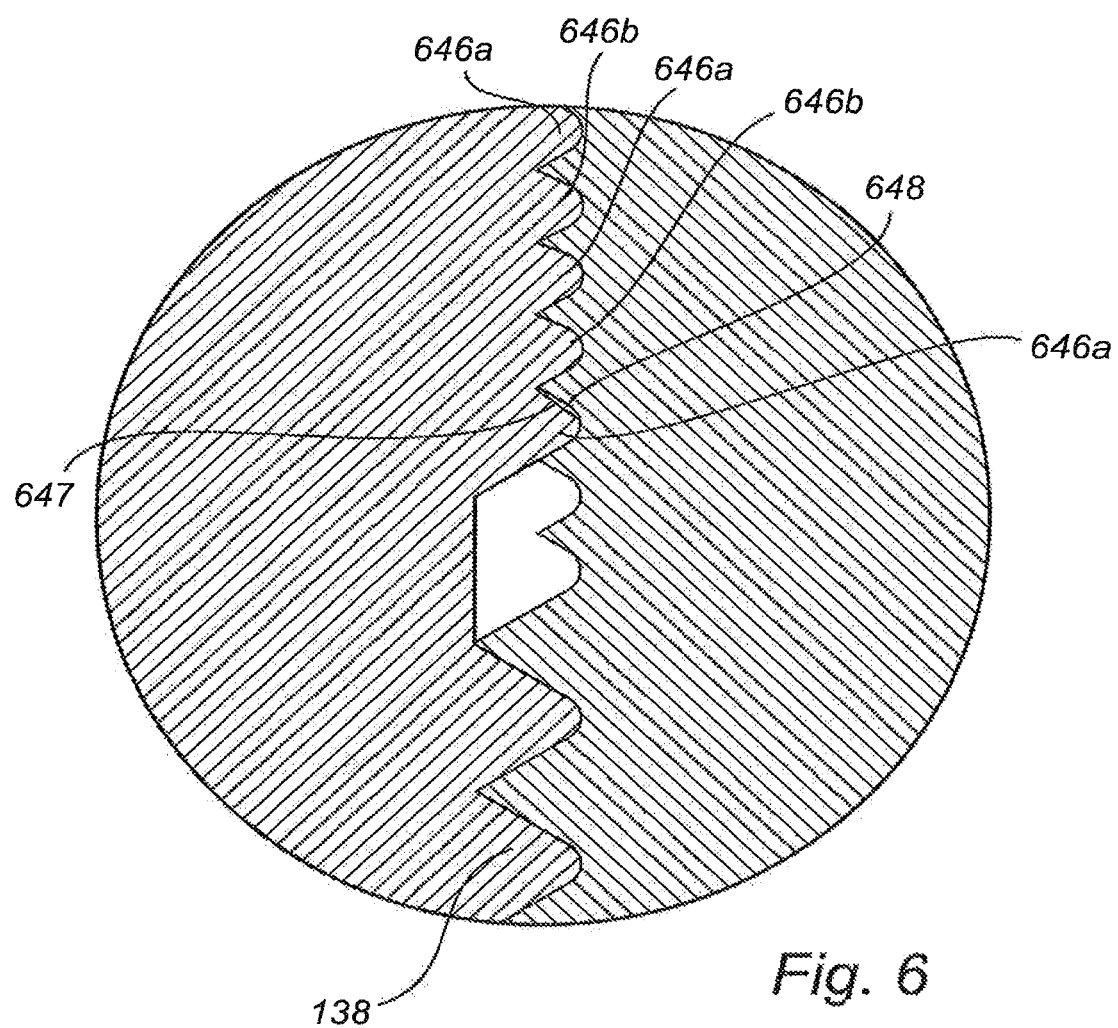
FIG. 6 illustrates an example of a fixture installed in bone according to at least one other example embodiment of the present invention.

FIG. 9 is a side view illustrating a fixture 10 according to at least one example embodiment of the invention. The fixture 10 in FIG. 9 comprises a leading portion 32 and a trailing portion 36 located coronally of the leading portion 32. Each one of said portions present a respective outer surface being threaded for engagement with the bone tissue, wherein thread tops 20 and thread bottoms 22 are provided alternatingly in the axial direction of the fixture 10. The leading portion is in this embodiment provided with macrothreads 38 and the trailing portion is provided with multi-start microthreads 46, which in the illustrated embodiment is a double-thread.

At the apical end, the fixture is provided with cutting means/cutting edges 44, of which one is shown. The fixture is also provided with cutting means 48, of which one is shown, at the apical end of the trailing portion. The cutting means 48 in this embodiment extend over both thread spirals of the microthreads, so that they may cut a corresponding female thread in the bone for each one of the two thread spirals.

Although FIG. 9 illustrates that an apical portion 24 of the leading portion 32 is substantially straight and is provided with one or more cutting means 44, other alternatives are also conceivable, e.g. a section tapering in the apical portion being provided with cutting means, or a section tapering in the apical portion without cutting means, or a non-tapering apical portion without cutting means.

FIG. 9 illustrates a straight cylindrical fixture 10. However, the fixture may also be provided with a transition zone in which the diameter of the implant increases. Such a transition zone may be either non-threaded, macrothreaded or microthreaded.

FIG. 10 illustrates an alternative embodiment of a fixture. The features of the fixture in FIG. 10 being similar to the features of the fixture in FIG. 9 will not be elaborated upon herein. The difference between the fixture 1010 in FIG. 10 compared to the fixture in FIG. 9 is that in this embodiment, both the macrothreads 1038 and the microthreads 1046 are multi-start threads. The macrothreads 1038 is a double-thread, i.e. it has two thread starts, and the microthreads 1046 is a quadruple-thread, i.e. it has four thread starts. The cutting means 48 in this embodiment extend over all four thread spirals of the microthreads, so that they may cut a corresponding female thread in the bone for each one of the thread spirals.

FIGS. 1a-1b illustrate a detail of a fixture according to at least one example embodiment of the invention. In particular a part of the fixture is shown in cross-section, wherein the fixture has a leading portion 132 and a substantially straight trailing portion 136. The leading portion 132 is provided with macrothreads 138 having thread tops 140 with a certain radius of curvature a. The thread tops 140 are flanked by apical and coronal flank portions 142a, 142b at a certain angle γ relative to a plane perpendicular to the central fixture axis. In this case the apical and coronal flanks 142a, 142b are illustrated as having the same angle γ. However, in alternative embodiments the apical and coronal flank angles may differ from each other. The macrothread 138 is provided with a cutting means, such as a cutting edge 144 similar to the cutting means 44 in FIG. 9, to make a corresponding female macrothread in the bone tissue.

Coronally of the macrothreads 138, the trailing portion 136 is provided with double-spiraled microthreads 146. The microthreads 146 have the same lead as the macrothread 138, the pitch being half the pitch of the macrothread 138. A cutting means 148 is present at the microthreads in the trailing portion 136 to make corresponding female microthreads in the bone tissue, similar to what has been described above for the cutting means 48 in FIG. 9. As can clearly be seen in FIG. 1, the cutting means extend over both thread spirals and are provided to cut a female thread having both corresponding minor and major diameter as the microthreads 146. In the illustrated embodiment, throughout the leading portion 132 and trailing portion 136, the tops 150 of the microthreads 146 have the same radius of curvature as the radius of curvature a of the macrothreads 138. Also, the flank angles of the apical flank 147a and the coronal flank 147b of the microthreads 146 correspond to those of the macrothreads 138. The effect of this conformation to the macrothreads 138 will now be explained.

The microthreads 146 are provided as two thread spirals, herein referred to as a first thread spiral 146a and a second thread spiral 146b. The first thread spiral 146a will follow the path of the macrothreads 138. The second thread spiral 146b will make its own path. The cutting means 144 at the macrothread 138 creates a female thread profile in the bone having the same radius of curvature a and the flank angles γ as the macrothread 138. Thus, when the first thread spiral 146a of the microthreads 146 enters the female bone thread it can theoretically be in full contact with the bone, since the thread tops have the same radius of curvature a and the flanks have the same angles γ as the female bone thread. This means that the initial stability of the fixture can be higher than if the first thread spiral of the microthreads would not fill out the space of the female bone thread. This is further illustrated in FIG. 5. With prior art implants, it is the macrothreads that mainly provide the initial stability, and only after the bone tissue has grown into the spaces created by the microthreads, the microthreads will contribute to the stability of the implant. With the inventive idea illustrated in this exemplary embodiment, also the microthreads will contribute to the initial stability of the implant, without compromising the long-term stability of the implant.

It should be noted that while the cutting means 148 at the microthreads 146 will make a new path for the second thread spiral 146b, it will, for the first thread spiral 46a, just enter into the already made female bone thread created by the cutting means 144 at the macrothread 138.

As can be seen in FIG. 1a, the fixture in this embodiment is a straight cylindrical implant, hence, the major diameter $D_1$ of the microthreaded section and the macrothreaded section are similar to each other. The valleys of the microthreads are situated further away from the central axis of the fixture, than the valleys of the macrothreads. In other words, the minor diameter $d_1$ of the trailing portion is larger than the minor diameter $d_2$ of the leading portion. The reason for this being that the microthreads have a lower height than the macrothreads, and they should, at least along a portion of the implant, fill out the female thread of the bone that the macrothread has traveled through during insertion. The outermost part of the macrothreads is for this embodiment the portion of the macrothreads being situated further away from the central axis of the implant than the minor diameter $d_1$ of the trailing portion.

FIGS. 2a-2b illustrate a detail of a fixture according to at least one other example embodiment of the invention. Features similar to those disclosed in FIGS. 1a-1b has been given the same reference numerals in FIGS. 2a-2b. In particular a part of the fixture is shown in cross-section, wherein the fixture, similar to the example embodiment in FIGS. 1a-1b, has a leading portion 232 and a substantially straight trailing portion 236. However, in this embodiment, the fixture is also provided with a coronally widening transition portion 234. In this transition zone, both the minor and major diameter of the fixture increases. This is illustrated in FIG. 2a where the major diameter $D_3$ and the minor diameter $d_3$ at the apical end of the transition portion are smaller than the major diameter $D_4$ and the minor diameter $d_4$ at the coronal end of the transition portion, respectively. The increased major diameter $D_4$ and the increased minor diameter $d_4$ is thereafter maintained in the straight trailing portion 236. The leading portion 232 is provided with macrothreads 138 similar to those described in relation to FIGS. 1a-1b. Coronally of the macrothreads 138, the transition portion 234 is provided. The transition portion 234 is provided with double-spiraled microthreads 146 which continue into the trailing portion 236. As can be seen in FIG. 2a, the transition zone extends over several, in the illustrated example three, turns of the double-thread spiral The microthreads 146 have the same characteristics as the microthreads described in relation to FIGS. 1a-1b, including also the cutting means 148, which in this embodiment is provided at the apical portion of the transition zone 234. The effect of this conformation to the macrothreads 138 is the same as the effect described in relation to FIGS. 1a-1b. As can also be seen in FIG. 2a, the major diameter of the cutting means 148 is similar to the major diameter $D_1$ of the leading portion. The major and minor diameters of the cutting means are also similar to the major and minor diameters of the first turn of the most apical non-cutting thread spiral of the transition portion. It is also seen in FIG. 2a that the increase in major and minor diameters of the transition portion starts coronally of the cutting means 148. Hence, there is no diameter increase at the cutting means.

The outermost part of the macrothreads is also for this embodiment the portion of the macrothreads being situated further away from the central axis than the minor diameter of the implant at the transition portion and the trailing portion. Hence, for this embodiment, the portion of the macrothreads being considered as the outermost part differs, depending on where along the axial length of the trailing portion and the transition portion a microthread is positioned. However, the important aspect is that the microthread following the path of a macrothread fills out the female thread created in the bone, at least along a portion of its length.

The purpose of increasing the major and minor diameter of the fixture in the transition portion and maintaining the increased diameters in the trailing portion is that the fixture should apply a desired static strain to the bone, once implanted. A desired static strain applied to the bone by the fixture has proven to be beneficial in relation to the osseointegration of the fixture.

The transition portion is in this exemplary embodiment microthreaded, however it is also conceivable that the transition portion is macrothreaded.

FIGS. 3a-3b illustrate a detail of a fixture according to at least one other example embodiment of the invention. The fixture in this embodiment has most features in common with the example embodiment illustrated in FIGS. 2a-2b, and similar features have been given the same reference numerals.

The illustrated fixture has a leading portion 332, a coronally widening transition portion 234 and a substantially straight trailing portion 236. The leading portion 332 is, similar to the previously described embodiments, provided with a macrothread extending from the apical end of the portion towards the coronal end. However, in this embodiment, the leading portion 332 is also provided with a non-threaded section 360. The surface of the non-threaded section may be either smooth or roughened.

It is important that the non-threaded section 360 has an axial length such that the threads being provided coronally of the non-threaded section follow the path of the threads being provided apically of the non-threaded section. In the illustrated example where the non-threaded section is provided between the macrothreaded portion and the microthreaded portion, it is important that is has an axial length such that one of the microthreads follows the path of the macrothread. The reason for this being that, similar to the previously described embodiments, the initial stability of the fixture can be higher than if one of thread spirals of the microthreads would not fill out the space of the female bone thread created by the macrothread.

The embodiment with a non-threaded section is here illustrated with a fixture having a transition portion 234, similar to the transition portion of the previous embodiment. It is however also conceivable with a non-threaded section 360 being provided on the straight fixture illustrated in FIGS. 1a-1b. Furthermore, the non-threaded section is in this embodiment provided at the leading portion. It is however also conceivable that the non-threaded section is provided on the transition portion (if present) or on the trailing portion of the fixture.

FIG. 4 illustrates an example of an installation of the fixture 10, illustrated in FIG. 9, according to at least one example embodiment of the invention. The fixture 10 is schematically illustrated as having a leading portion 32 and a trailing portion 36. The fixture 10 is intended to be installed in a bore hole 30 in the jawbone 62 under the gingiva 34. Surrounded by cancellous bone 62a an apical section 30a of the bore hole 30 has a first diameter, e.g. substantially corresponding to the core diameter of the leading portion 32. Surrounded by cortical bone 62b a coronal section 30b of the bore hole 30 has a second diameter, for instance corresponding to the core diameter of the trailing portion 36. When the fixture has been installed in the bone, the leading portion 32 will be positioned in the apical section 30a and the trailing portion 36 will be positioned in the coronal section 30b.

In the following, different example embodiments of fixtures being installed in bone will be illustrated.

FIG. 5 illustrate an embodiment of a fixture having a threading and general outline according to the fixture illustrated in FIGS. 1a-1b when it is installed in bone 62. As mentioned in relation to FIGS. 1a-1b, every second microthread 146a follows the path of the macrothread 138 in the bone and the microthread 146*a* following the path of the macrothread 138 has the same profile characteristics as the macrothread. As can be seen in FIG. 5, the microthread therefore fills out the female thread in the bone 62 and the fixture becomes supported along its entire length. In the embodiment illustrated in FIG. 5, also the other microthread 146*b* has the same profile characteristics as the macrothread 138.

FIG. 6 illustrate an embodiment of a fixture having a threading and general outline according to the fixture illustrated in FIGS. 1*a*-1*b* and 5 when it is installed in bone 62. However, in this example embodiment, the upper flank 647 of the microthread 646*a* following the path of the macrothread 138 has a different geometry than the upper flank of the macrothread 138 along a portion of its length. Hence, the female thread in the bone is not entirely filled by the microthread, along a portion of the length of the microthread. This results in the creation of blood chambers 648 between the bone and the fixture, which may have a positive effect in the osseointegration of the fixture in the bone. It is only along a portion of its length that the microthread following the path of the macrothread has a different upper flank angle. Along the remaining portions of its length it has the same characteristics as the microthread 146*a* in e.g. FIG. 1. Consequently, along these portions of the fixture's length the female thread becomes filled by the microthread. Hence, the fixture is well supported in the bone. The other microthread 646*b* is in this embodiment similar to the microthread 146*b* in e.g. FIG. 1.

Figure 7:
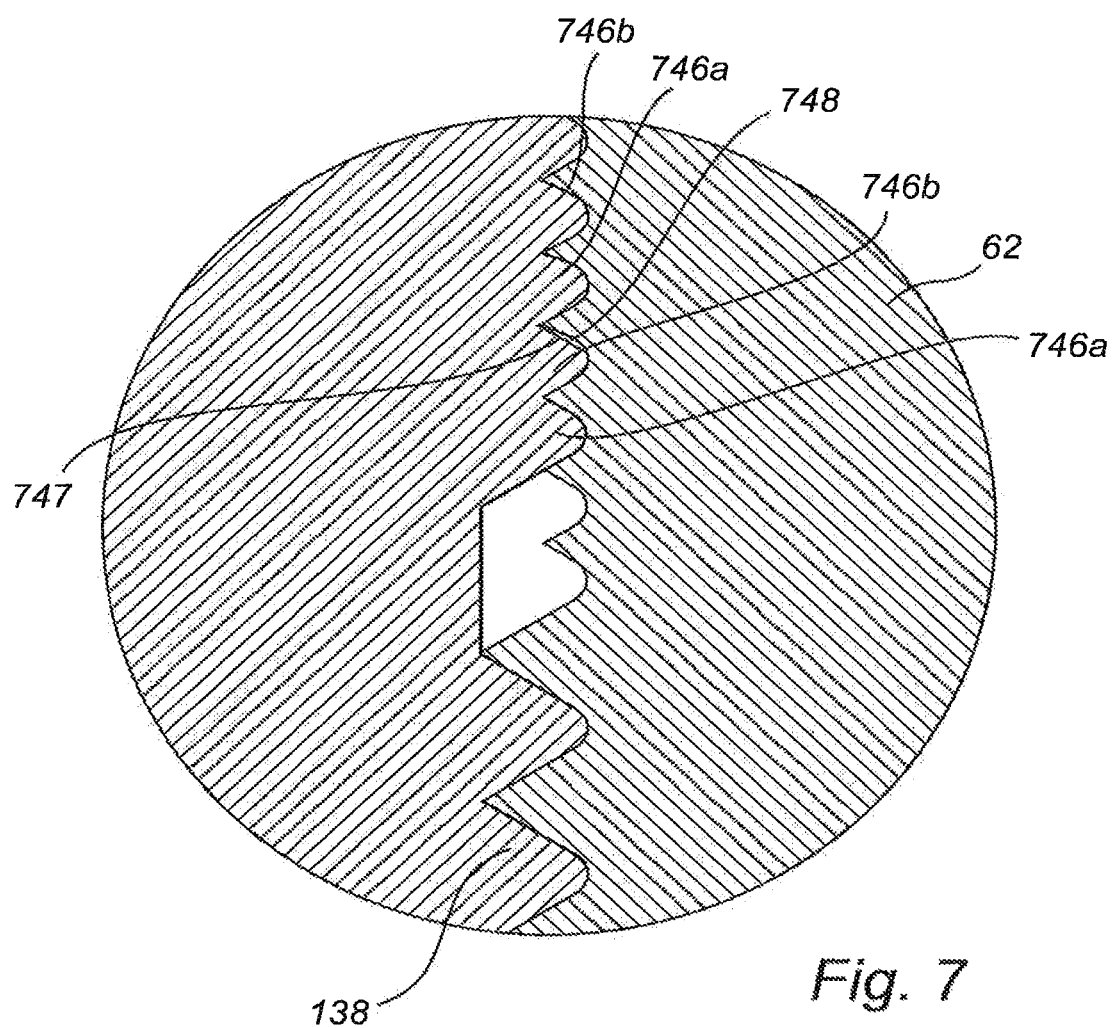
FIG. 7 illustrates an example of a fixture installed in bone according to at least one other example embodiment of the present invention.

FIG. 7 illustrates an embodiment of a fixture installed in the bone 62 having a threading and general outline according to the fixture illustrated in FIG. 6. However, in this embodiment it is the microthread 746*b*, that does not follow the path of the macrothread 138, that has a different upper flank 747 profile, at least along a portion of its length. Similarly to the embodiment illustrated in FIG. 6, this results in the creation of blood chambers 748 between the bone and the fixture, which may have a positive effect regarding the osseoeintegration of the fixture in the bone. The other microthread 746*a* is in this embodiment similar to the microthread 146*a* in e.g. FIG. 1.

In the two embodiments illustrated in FIGS. 6 and 7, the flank angle of the upper flank of the microthread has been modified in order to create the blood chambers. It is however also conceivable with amending other features of the threads in order to create blood chambers. For instance, the radius of curvature at the top of the peak may be altered, or the height of the peak may be shortened.

Figure 8:
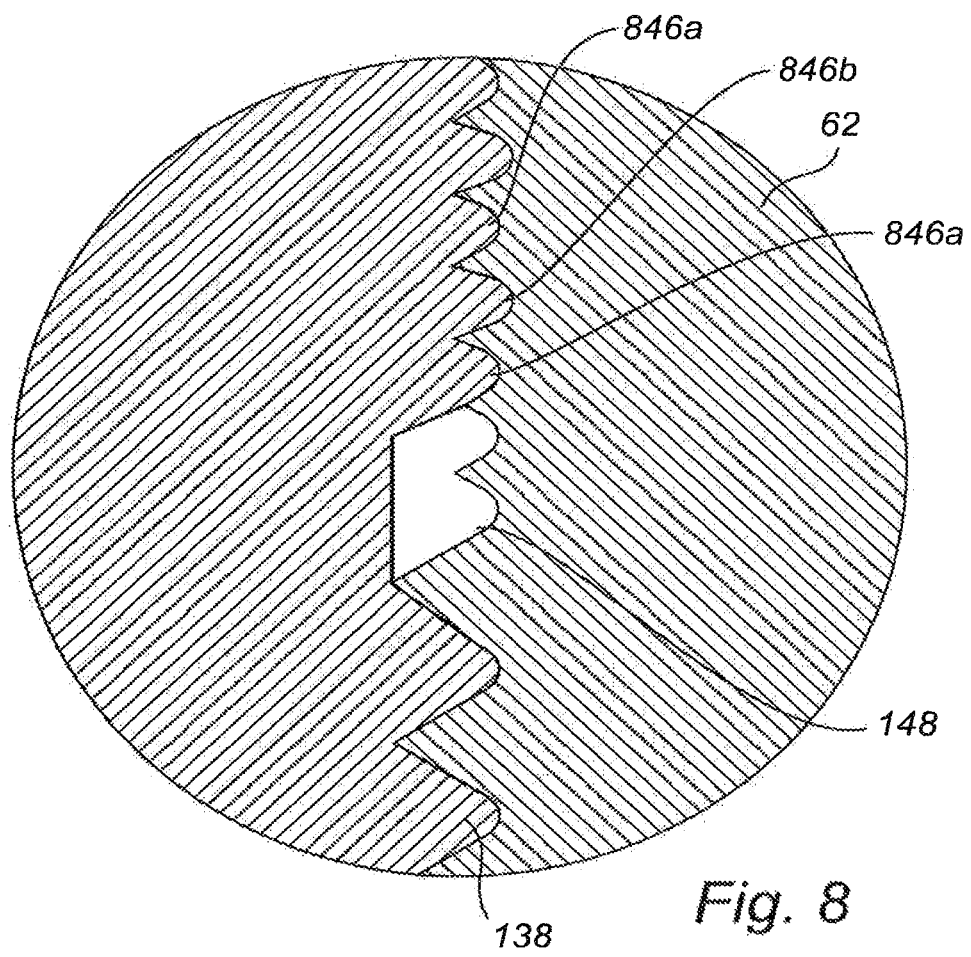
FIG. 8 illustrates an example of a fixture installed in bone according to at least one other example embodiment of the present invention.

FIG. 8 illustrate an embodiment of a fixture installed in bone 62 having a threading and general outline according to the fixture illustrated in FIGS. 1*a*-1*b* and 5. However, in this example embodiment, the height of the microthreads 846*b*, that do not follow the path of the macrothread, is provided so that the major diameter of the fixture at the position of the microthread 846*b* is increased. Hence, the female thread in the bone created by the cutting means 144 of the macrothread 138 will not be deep enough to accommodate the entire microthread 846*b*. This results in that the bone 62 becomes condensated at the positions where the microthread 846*b* is pressed into it. Condensation of the bone provides a static strain at these positions, which may have a positive effect in the osseointegration of the fixture in the bone.

As can also be seen in FIG. 8, the cutting means 148 are also in this embodiment similar to the cutting means 148 illustrated in e.g. FIG. 1. Hence, they do not provide for a female thread having the same height as the microthread 846*b*. The reason for this being that in order to achieve the condensation of the bone, the female thread in the bone may not be cut to match the shape and size of the microthread.

The increased height of the microthreads 846*b*, providing the condensation of the bone, may be provided either along the entire microthread or only along a portion of it. An increased height of thread creates an increased major diameter of the implant at that position of the implant. If the increased height of the thread is only provided along a portion of the thread spiral, and this portion is not only at the coronal end of the implant, there may exist blood chambers at the position where the thread spiral does not have an increased height. The reason for this being that when the implant is inserted, the portion of the thread with increased height will press into the bone and condensate it. Thereafter, if the height of the thread being located coronally of the portion with increased height has a smaller height e.g. the normal height of the thread (the same size as for the other threads), there will be a gap between the thread with normal height and the bone that has been pressed away. However, if the increase in thread height has only been slight, and thus also the condensation of the bone has only been minor, the bone, and the female thread created in the bone, may return to its original shape when the portion of the thread with increased height has passed. In this case, there will be condensation of the bone at the final position of the thread with increased height, but there will be no blood chambers coronally of that position. Hence, a thread with normal height will, as for the other illustrated embodiments, fill out the female thread in the bone.

Furthermore, in FIG. 8, it has been illustrated that it is the microthread 846*b*, i.e. the microthread not following the path of the macrothread 138, that provides the condensation in the bone and that the other microthread 846*a* provides the same major diameter as the macrothread 138. It is however also conceivable that it is either the other microthread 846*a* or both microthreads 846*a*, 846*b* that is/are provided to condensate the bone.

Figure 11:
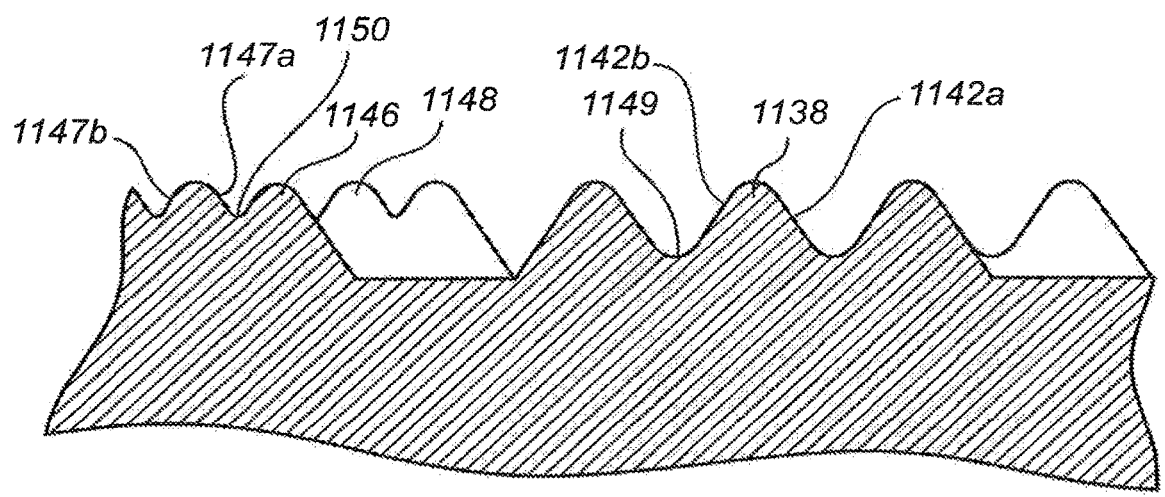
FIG. 11 illustrate a thread profile according to at least one example embodiment of the present invention.

FIG. 11 illustrate an exemplary embodiment of the thread profile. The thread profile of the microthreads and macrothreads in FIGS. 1-8 is illustrated as having straight flank portions that meet each other in an acute angle. In the embodiment illustrated in FIG. 11 the microthreads 1146 and macrothreads 1138 are also provided with straight flank portions 1147*a*, 1147*b* and 1142*a*, 1142*b*, respectively, but the intersection between adjacent peaks is in the form of a curved portion 1150 and 1149, respectively. Hence, the thread has a bottom radius. The bottom radius of the microthread is in this embodiment a characteristic that differs between the microthread and the outermost part of the macrothread. This is because the macrothread has straight flank angles and a bottom radius that is situated closer to the central axis of the implant. Hence, in this embodiment, the microthread has the same profile as the outermost part of the macrothread, except for the curved portion at the intersection between adjacent peaks. In use, the microthread following the path of the macrothread will fill the female thread created in the bone by the macrothread. The bottom radius of the microthread will, similar to the microthread not following the path of the macrothread, enter into the bone in a female thread being cut by the cutting means 1148 at the microthread 1146. Also in this embodiment the cutting means extend over both thread spirals of a double-thread. Consequently, this embodiment falls within the scope of the appended claims in which it is defined that the profile of the microthread is substantially the same as the profile of the macrothread.

Figure 12:
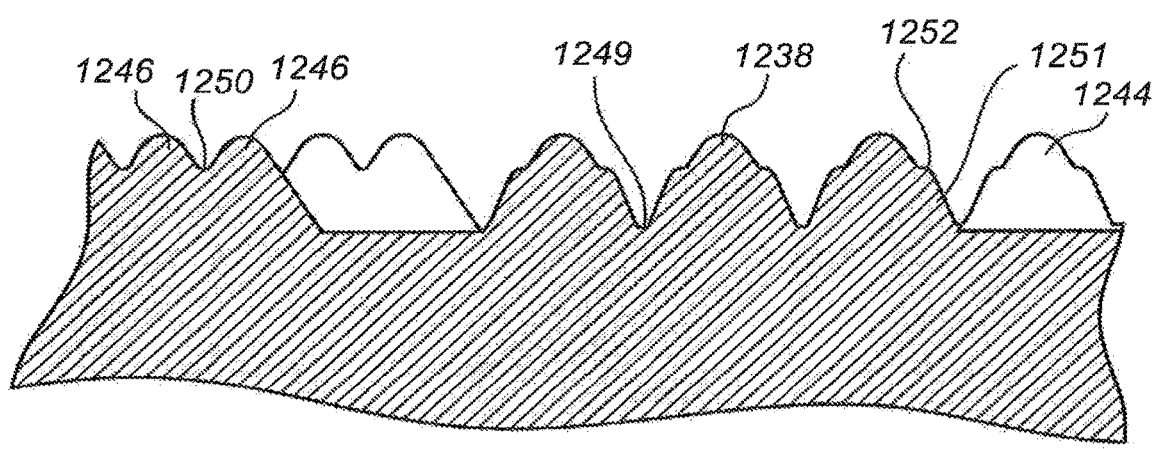
FIG. 12 illustrate a thread profile according to at least one other example embodiment of the present invention.

FIG. 12 illustrate a further exemplary embodiment of thread profiles. Similar to the embodiment illustrated in FIG. 11, the microthread 1246 and the macrothread 1238 are provided with a curved portion at the intersection between adjacent peaks, i.e. it is provided with bottom radiuses. However, in this embodiment, the macrothread 1238 is provided with an additional shoulder 1251 on both its apical and coronal sides, resembling the bottom radius of the microthread and being positioned at the same distance from the central axis of the implant as the bottom radius of the microthread. The upper part 1252 of the shoulder has a size and extension being substantially the same as half the curvature at the bottom radius of the microthread. The cutting means 1244 at the apical end of the implant is provided with similar shoulders. The purpose of these shoulders is to create a female thread in the bone that has a shape which also includes the bottom radius of the microthread. Hence, the microthread in this embodiment will in use fill the female thread in the bone created by the cutting means at the macrothread. The macrothread, having a similar shoulder as the cutting means, will also fill out the female thread created in the bone. The outermost part of the macrothread is in this embodiment considered to be the portion of the macrothread being situated further away from the central axis of the implant than the shoulder.

FIGS. 5-8 illustrate different embodiments of a fixture having the same general outline as illustrated in FIGS. 1a-1b. However, any one of the embodiments illustrated in FIGS. 5-8 may also be combined with the outline of the fixtures illustrated in any one of FIGS. 2a-2b and 3a-3b, i.e. a fixture with a transition portion in which the implant's major and minor diameters increase. Furthermore, any of the embodiments illustrated in FIGS. 1a-8 may be combined with any one of the thread profiled illustrated in FIGS. 11 and 12.

The inventive implant has been described in relation to a number of exemplary embodiments. However, further modifications are conceivable within the scope of the appended claims.

The different embodiments of the fixture have throughout the description been illustrated as a self-tapping fixture. However, it is also conceivable with a fixture without any cutting means, adapted to be inserted into a hole that has been prepared by a thread maker or tapper that provides the female bone thread. It is also possible with a fixture that is not provided with any cutting means but are adapted to be inserted into a hole that has not been pre-tapped.

The leading portion of the fixture has been illustrated as a straight cylindrical portion. However, it is also conceivable with slightly conical leading portions.

The macrothreaded portion has been illustrated as comprising a thread having only one thread start. It is however also conceivable with a thread having more than one thread start/spiral.

The microthreaded portion has been illustrated as comprising a thread having two thread starts. It is however also conceivable with a thread having three or more thread starts/spirals.

The invention claimed is:

1. A fixture for insertion into a bore hole arranged in bone tissue, comprising a threaded leading portion and a threaded trailing portion located coronally of the threaded leading portion,
wherein the threading of the threaded leading portion has at least one first thread spiral,
wherein the threading of the threaded trailing portion has at least one more thread spirals than a number of thread spirals of the threaded leading portion,
wherein the threading of the threaded trailing portion and the threading of the threaded leading portion have the same or substantially the same lead,
wherein the profile of at least one of the thread spirals in the threaded trailing portion is, at least along a portion of its extension, substantially the same as the profile of the outermost part of said at least one first thread spiral in the threaded leading portion, and
wherein the at least one thread spiral in the threaded trailing portion having substantially the same profile as the outermost part of said at least one first thread spiral in the threaded leading portion is arranged to follow the spiral path of said at least one first thread spiral
wherein said substantially the same profile is such that the thread spiral in the threaded trailing portion that follows the path of said at least one first thread spiral in the threaded leading portion (i) has the same radius of curvature at a top of the peaks as said at least one first thread spiral, which peaks individually have a circular or curved profile when viewed in a longitudinal cross-section, and (ii) also has the same apical and coronal flank angles relative to a plane perpendicular to a central fixture axis, respectively, as said at least one first thread spiral
wherein a major diameter of the fixture is similar in both the threaded leading portion and the threaded trailing portion.

2. A fixture according to claim 1, wherein the at least one more thread spirals in the threaded trailing portion have substantially the same profile as the outermost part of said first thread spiral in the threaded leading portion.

3. A fixture according to claim 1, wherein the profile of one of the thread spirals of the at least one more thread spirals in the threaded trailing portion, that does not follow the path of said first thread spiral in the threaded leading portion, alters along the thread.

4. A fixture according to claim 1, wherein the smallest spacing between adjacent peaks of the threading in the threaded trailing portion is smaller than the smallest spacing between adjacent peaks of the threading in the threaded leading portion.

5. A fixture according to claim 1, wherein the number of the at least one more thread spirals in the threaded trailing portion is an integer multiple of the number of thread spirals in the threaded leading portion.

6. A fixture according to claim 1, wherein the threading in the threaded leading portion has at least a first and a second thread spiral, and wherein one of the at least one more thread spirals in the threaded trailing portion follows the path of said first thread spiral in the threaded leading portion.

7. A fixture according to claim 1, wherein the fixture is self-tapping.

8. A fixture according to claim 1, wherein the fixture is provided with separate cutting means adapted for cutting a female thread in the bone that corresponds to the profile of at least one of the thread spirals of the at least one more thread spirals at the threaded trailing portion.

9. A fixture according to claim 1, wherein the depth of the threads in the threaded leading portion is larger than the depth of the threads in the threaded trailing portion.

* * * * *